United States Patent Office
3,359,170
Patented Dec. 19, 1967

3,359,170
NOVEL DENTIFRICE AND METHOD
OF PREPARATION
Fred McCollough, Jr., Jacksonville, and Julian E. Blanch, Tinley Park, Ill., assignors to Stauffer Chemical Company, New York, N.Y., a corporation of Delaware
No Drawing. Filed Oct. 26, 1964, Ser. No. 406,549
9 Claims. (Cl. 167—93)

This invention relates to an improved dentifrice polishing agent and its process of preparation. More particularly, it relates to calcium pyrophosphate for use in dentifrice compositions which is low in abrasion and which is compatible with stannous fluoride, and to a method for preparing this improved dentifrice polishing agent.

It is known that the application of stannous fluoride to the teeth aids in the reduction of dental caries. Although the combination of a fluoride salt and dentifrice abrasive in dentifrice compositions has become commonplace, the success of fluoride dentifrice compositions containing the most commonly used polishing agent, calcium pyrophosphate, has been hindered somewhat by a tendency of the polishing agent to become excessively abrasive when made compatible with the fluoride salt. One of the problems has been that dibasic calcium orthophosphate dihydrate, when thermally converted to calcium pyrophosphate, other than by a very slow molecular dehydration, tends to form large abrasive crystals. When converted slowly so that the dihydrate is first slowly converted to anhydrous dibasic calcium orthophosphate, the processing time is increased, resulting in greater costs. Another problem has been to produce a calcium pyrophosphate polishing agent compatible with fluoride while still having acceptable abrasion characteristics.

The stannous ion compatibility has also proven to be important in that the tin (II), when supplied from stannous fluoride, somehow aids in reducing tooth decay. Recent studies have indicated that the tin (II) reacts, like the fluoride ion, at the surface or slightly within tooth enamel to form a complex tin compound, probably tin hydroxyorthophosphate, see, e.g., Journal of Dental Research, vol. 4, No. 6, November–December 1961, pp. 1199–1210, and that erupted human teeth are deficient in tin in the outermost layers, containing virtually none in deeper layers (Ibid. p. 1200). Like the fluoride ion, the tin (II) tends to react when combined with other chemical ingredients thereby becoming inactivated or unavailable when applied topically to the teeth. It is therefore required that stannous fluoride decay preventatives, be utilized in a compatible medium if it is to be effective at the time of topical application to the teeth. Consequently, an objective heretofore has been to develop an economical and practical process for the manufacture of calcium pyrophosphate which has low abrasiveness and which is stannous ion and fluoride ion compatible. Ideally, the stannous and fluoride ion compatibilities should be as high as possible, and the RDA (Radiological Dentin Abrasion, explained hereinafter) test abrasion values should be no higher than 700.

An object of this invention is to provide a calcium pyrophosphate polishing agent which is low in abrasion and compatible with stannous fluoride.

A further object of this invention is to provide a process for preparing a low abrasive stannous fluoride compatible calcium pyrophosphate polishing agent for use in dentifrice compositions.

Other objects will be apparent from the following detailed description of the invention.

We have now discovered that a low abrasive compatible calcium pyrophosphate can be produced by a one-step process which comprises thermally converting a mixture comprising dibasic calcium orthophosphate dihydrate and calcium pyrophosphate. It is possible by our one-step recycle process to produce a high quality dental grade product, in less time with easier control, and less elaborate equipment. In general, the calcium pyrophosphate of this invention is formed by the thermal molecular dehydration of a starting material comprising 20% to 50% dental grade calcium pyrophosphate (with about 5% to 70% in the beta phase modification—see U.S. Patent No. 2,876,168), the balance being substantially gamma phase, and 50% to 80% dibasic calcium orthophosphate, either anhydrous or hydrated.

The invention is described in connection with dicalcium phosphate dihydrate, but only for convenience, by reason of the fact that the dihydrate must first be converted to the anhydrous form before the conversion of the latter to calcium pyrophosphate. The crystalline phase or modification composition of calcium pyrophosphate can be determined by X-ray diffraction techniques or by infrared absorption spectra using techniques fully described in the aforementioned U.S. patent. The starting mixture may be a blend containing previously manufactured dental grade calcium pyrophosphate, or a continuous recycle may be used whereby 20% to 50% of the calcium pyrophosphate product is returned and intimately intermixed with fresh dicalcium phosphate feed.

The present process is generally applicable to the preparation of calcium pyrophosphate from dicalcium phosphate, either anhydrous or hydrated, and may be conducted at any temperature at which the latter starting materials will undergo molecular dehydration to form calcium pyrophosphate. As known in the prior art, molecular dehydration of dicalcium phosphate may be accomplished at any temperature above about 300° C. and 800° C. is preferable for producing the highly compatible, low abrasive calcium pyrophosphates commonly used as dentifrice polishing agents in the well-known stannous fluoride toothpastes. Calcium pyrophosphate produced at temperatures above about 800° C. are generally somewhat more abrasive than desirable, while those polishing agents produced below about 600° C. have a greater tendency to inactivate the fluoride constituent.

The time required to effect molecular dehydration of the diacalcium phosphate component of our feed mixtures is a complex function of conversion temperature, composition of the feed mixture, type of calcining equipment, degree of agitation, etc. At conversion temperatures within the range of 600° C. and 800° C., the conversion time for a feed containing 40% by weight recycled calcium pyrophosphate will normally be 0.5 to 3.0 hours. For temperatures higher than 800° C., a correspondingly shorter conversion time is necessary and, conversely, longer conversion times are necessary at lower temperatures.

It is believed that the addition of the calcium pyrophosphate to the dicalcium phosphate feed produces a catalytic effect since it has been found that the reaction time necessary to convert the latter to the former is considerably shortened and said reaction takes place at a lower temperature. The addition of $Al_2O_3$, $SiO_2$, incompletely converted calcium pyrophosphate with less than about 5% in the beta phase, or completely converted unreactive calcium pyrophosphate having more than about 70% in the beta phase, to the diacalcium phosphate dihydrate has no effect on either reaction time or temperature which would seem to indicate clearly that the dental grade calcium pyrophosphate additive does not act simply as a diluent. While calcium pyrophosphate is normally converted from gamma to beta phase at about 800° C., when the starting material is "pure" diacalcium phosphate dihydrate, it has been found this conversion takes place at 765° to 790° C. when about 50% to 20% calcium pyrophosphate (5% to 70% in beta phase) is present in the feed. The preferred amount of calcium pyrophosphate in the feed is 35% to 45% with about 40% yielding optimum results.

The catalytic effect of the addition of dental grade calcium pyrophosphate to the dicalcium phosphate dihydrate feed is demonstrated in Example 1, infra, by the much higher fluorine and tin compatibilities than is shown for the control sample. For comparison, it has been found experimentally that in order to obtain a polishing agent of equal quality to that obtained by heating a mixture comprising 40% dental grade calcium pyrophosphate and 60% dicalcium phosphate dihydrate for 1 hour at 670° C., it is necessary to heat a feed of "pure" dicalcium phosphate dihydrate for about 2½ hours at 670° C.

The following specific examples are given to illustrate the invention, but no unnecessary limitations should be implied therefrom. Unless otherwise stated, all percentages herein are by weight.

EXAMPLE 1

Four 300 gram mixtures of 40% dental grade calcium pyrophosphate (about 40% in the beta modification) and 60% dicalcium phosphate dihydrate, were thermally converted in a muffle furnace for one hour at 670° C. As a control, a sample of "pure" dicalcium phosphate dihydrate was converted under identical conditions for the same period of time. In order to test the compatibility of these samples in solution with stannous and fluoride ions, and thus the availability of the latter ions to aid in the reduction of dental caries, the following test was run: Ten gram samples of the abrasive were agitated for one hour in 100 ml. portions of a solution containing 250 p.p.m. of fluoride (added as $SnF_2$). After centrifuging, aliquots of the clear supernatant liquid were analyzed for fluorine by means of the well-known Willard and Winter procedure which includes distillation in the presence of perchloric acid, and titration of the distillate against thorium nitrate in the presence of alizarin sulfonate. The amount of fluorine found is shown in Table I, infra, and expressed as percent of original fluorine in the solution. The amount of Sn (II) was determined by standard analytical procedure and is expressed in Table I as percent of original Sn (II) in the solution. Radiological Dentin Abrasion values of the thermally converted samples were obtained by the method of Grabenstetter et al., described in the Journal of Dental Research 37, 1060–1068 (1958) and are also shown in the following table:

TABLE I.—CALCIUM PYROPHOSPHATE POLISHING AGENT

| Feed Sample | Percent Sn Compatibility | Percent F Compatibility | Radiological Dentin Abrasion |
|---|---|---|---|
| 1* | 46 | 65 | 574 |
| 2 | 61 | 77 | 670 |
| 3 | 59 | 73 | 660 |
| 4 | 60 | 77 | 663 |
| 5 | 59 | 76 | 637 |

*Control sample.

Tin (II) and fluorine compatibilities and RDA values shown in the examples hereinafter were determined by the above described methods.

EXAMPLE 2

Using the procedure described in Example 1, two sample mixtures consisting of 30% calcium pyrophosphate and 70% diacalcium phosphate dihydrate were prepared and thermally converted at 670° C. The results are shown in the following table wherein Sample 1 is the dicalcium phosphate dihydrate control:

TABLE II.—CALCIUM PYROPHOSPHATE POLISHING AGENT

| Feed Sample | Percent Sn Compatibility | Percent F Compatibility | Radiological Dentin Abrasion |
|---|---|---|---|
| 1* | 39 | 62 | 585 |
| 2 | 48 | 69 | 575 |
| 3 | 50 | 70 | 585 |

*Control sample.

EXAMPLE 3

Using the method described in Example 1, mixtures containing 20% and 50% dental grade calcium pyrophosphate (the remainder dicalcium phosphate dihydrate) were heated at a temperature of 670° and 650° C., respectively, for one hour and the results are shown in Table III. Sample 1 again is the dicalcium phosphate dihydrate control.

TABLE III.—CALCIUM PYROPHOSPHATE POLISHING AGENT

| Feed Sample | Percent Sn Compatibility | Percent F Compatibility | Radiological Dentin Abrasion |
|---|---|---|---|
| 1 (control sample) | 44 | 66 | 569 |
| 2 (20% $Ca_2P_2O_7$ added to feed) | 51 | 73 | 561 |
| 3 (50% $Ca_2P_2O_7$ added to feed) | 47 | 68 | 481 |

The improved compositions of this invention may be used in toothpastes, tooth powders, or in any aqueous media for oral application to the teeth. Although the invention is described in connection with stannous fluoride, fluorine may be supplied by any water soluble compound such as sodium fluoride, potassium fluoride, and ammonium fluoride. Likewise, stannous ions may be supplied from any water soluble compound such as stannous chloride or stannous gluconate.

Dentifrice compositions comprising the polishing agents of the invention should contain from 100 to 4000 p.p.m. fluorine and preferably about 1000 p.p.m. of stannous tin. In a dentifrice paste composition the calcium pyrophosphate polishing agent will range between 20% and 60% by weight of the composition and may be the sole polishing material or admixed with a minor proportion of other polishing materials. The paste base will normally also contain water, from 10% to 50%, and in varying proportions: A binder or gum such as Irish moss extract, tragacanth, sodium carboxymethyl cellulose or alginates; a humectant or plasticizer such as glycerin or sorbitol; a preservative such as methyl or ethyl parahydroxybenzoate, sodium benzoate, or formaldehyde; a detergent such as sulfocolaurate or sodium lauryl sulfate; and a sweetener such as saccharin. Various other materials may be incorporated in the dentifrice pastes, e.g., flavoring agents, coloring or whitening agents, chlorophyll compounds, and the like.

The following is illustrative of dentifrice paste formulations comprising the novel polishing agents of this invention. The composition is prepared in the usual manner and all amounts are by weight.

*Formulation*

| | Percent |
|---|---|
| Calcium pyrophosphate | 39.00 |
| Stannous pyrophosphate | 1.00 |
| Stannous fluoride | 0.40 |
| Carboxymethyl cellulose | 0.70 |
| Magnesium aluminum silicate | 0.80 |
| Glycerin (95% aqueous soln.) | 18.00 |
| Sorbitol (70% aqueous soln.) | 12.00 |
| Sulfocolaurate | 1.51 |
| Ethyl parahydroxybenzoate | 0.10 |
| Flavoring | 1.00 |
| Water | 25.49 |

Although the present invention has been described with reference to patricular embodiments and examples, it will be apparent to those skilled in the art that variations and modifications of the invention can be made, and that equivalents can be substituted therefor without departing from tne principles and true spirit of the invention.

Having thus described the invention, what is claimed is:

1. A process for preparing a calcium pyrophosphate dentifrice polishing agent characterized by high ionic compatibility and low dentin abrasion which comprises heating a feed mixture comprising a catalytic amount of preformed calcium pyrophosphate, of which about 5% to 70% by weight is in the beta phase modification, with the remainder dicalcium phosphate until said feed mixture is molecularly dehydrated to calcium pyrophosphate of which about 5% to 70% is in the beta modification.

2. The process according to claim 1, wherein the feed mixture is heated at temperatures between about 600° C. and 850° C.

3. A process for preparing a calcium pyrophosphate dentifrice polishing agent characterized by high ionic compatibility and low dentin abrasion which comprises heating a feed mixture comprising about 35% to 45% calcium pyrophosphate of which about 5% to 70% is in the beta modification, and the remainder dicalcium phosphate until said feed mixture is converted to calcium pyrophosphate of which about 5% to 70% is in the beta modification.

4. The process according to claim 3 wherein the feed mixture is heated at temperatures between about 600° C. and 850° C.

5. A calcium pyrophosphate dentifrice polishing agent especially adapted for use in a fluorine-containing dentifrice composition comprising a calcium pyrophosphate of which 5% to 70% is in the beta phase modification, said abrasive being derived by heating at a temperature between 600° C. and 850° C. a feed mixture comprising 20% to 50% dental grade calcium pyrophosphate of which about 5% to 70% is in the beta phase modification and the remainder dicalcium phosphate dihydrate.

6. A dentifrice paste composition comprising a water soluble fluoride, a calcium pyrophosphate polishing agent produced by a process which comprises heating a feed mixture consisting of between 20% and 50% by weight of preformed calcium pyrophosphate of which 5% to 70% by weight is in the beta phase modification with the remainder dicalcium phosphate until said feed mixture is converted to calcium pyrophosphate of which 5% to 70% by weight is in the beta phase modification, and a paste base.

7. The dentifrice paste of claim 6 wherein the polishing agent is produced by heating the feed mixture at a temperature between 600° C. and 850° C.

8. A continuous process for producing a calcium pyrophosphate dentifrice polishing agent characterized by high ionic compatibility with stannous fluoride and low dentin abrasion which comprises passing a feed mixture consisting of between 20% and 50% calcium pyrophosphate with the remainder substantially all dicalcium phosphate through a conversion zone maintained at a temperature between 600° C. and 850° C. until said feed is converted to calcium pyrophosphate product of which 5% to 70% by weight is in the beta phase modification, said calcium pyrophosphate in said feed mixture being recycled product.

9. A novel calcium pyrophosphate dentifrice polishing agent prepared by a process which comprises heating at a temperature between 600° C. and 850° C. a feed mixture consisting of 20% to 50% by weight of preformed calcium pyrophosphate, of which about 5% to 70% by weight is in the beta phase modification with the remainder dicalcium phosphate until said feed mixture is converted to calcium pyrophosphate of which about 5% to 70% is in the beta phase modification.

References Cited

UNITED STATES PATENTS 3,112,247  11/1963  Schweizer _____ 167—93

MILTON WEISSMAN, *Primary Examiner.*